United States Patent Office 3,082,420
Patented Mar. 19, 1963

3,082,420
COORDINATE CONVERTER FOR RADIO
NAVIGATION SYSTEMS
Karl Heinrich Ramsayer, 54 Hasenberstrasse,
Stuttgart, Germany
Filed Apr. 29, 1959, Ser. No. 809,641
Claims priority, application Germany May 12, 1958
7 Claims. (Cl. 343—112)

With respect to the navigation of aircraft, marine vessels and land vehicles radio location systems have already become known with the aid of which the position can be determined within a local coordinate system. Thus, for example, in the case of the TACAN-method both the distance and the magnetic direction from a transmitter to the position, that is polar coordinates of the position can be ascertained. The actual navigation within such a position-finding system, however, is regarded simple only when one of the indicated coordinates can be kept constant, that is, when for instance in the case of the TACAN-system the direction to the transmitter can be kept constant, in other words when it is rendered possible to steer the craft to the transmitter, or radially away therefrom.

For the steering of any desired courses there have been developed special display and computing devices, such as map display devices for displaying the position on a map, or devices for displaying the distance to a previously selected destination and the athwart position to a previously selected desired straight course.

However, these devices or equipments bear the disadvantage that they respectively only relate to a certain local radio coordinate system, so that when changing over to the adjoining radio coordinate system a partially rather complicated readjustment of the display or computing device respectively, becomes necessary. With respect to the navigation of high-speed aircraft, passing through the area of one radio coordinate system within a short period of time, this disadvantage has a particularly disturbing effect. It is a further disadvantage of the aforementioned radio navigation equipments that the course leading to the destination is not being displayed or indicated. Any desired destination can only be made for by way of proving, and by checking whether the position indication, in the course of time, deviates from the intended path, and by changing or correcting the steered course according to estimations.

The hitherto existing difficulties appearing when changing from one radio coordinate system to the adjoining one are overcome by the invention, as will be described hereinafter, in that the position coordinates as measured in any arbitrary system within a network of radio position-finding systems are converted with the aid of a special coordinate converter into uniform standard types of coordinates which are substituted for the local coordinates in the different radio position-finding systems.

The conventional deficiencies apparent when heading for any desired destination, and which are particularly noticeable in air navigation due to the effect of wind, are eliminated in accordance with the present invention in that the coordinate converter is in such a way combined with an automatic dead reckoning computer determining both the position and the track from the airspeed and the wind velocity, and provided with an automatic wind-correcting device, that by the automatic readjustment of the wind setting of the dead reckoning computer the position indication or display of the dead reckoning computer is either continuously or from time to time readjusted to the uniform coordinates as calculated by the coordinate converter.

In the following the invention will now be described in particular with respect to a polar-coordinate radio location network, e.g. a VORTAC-network or a TACAN-network. The description is made according to the accompanying drawings, in which.

Figure 1:
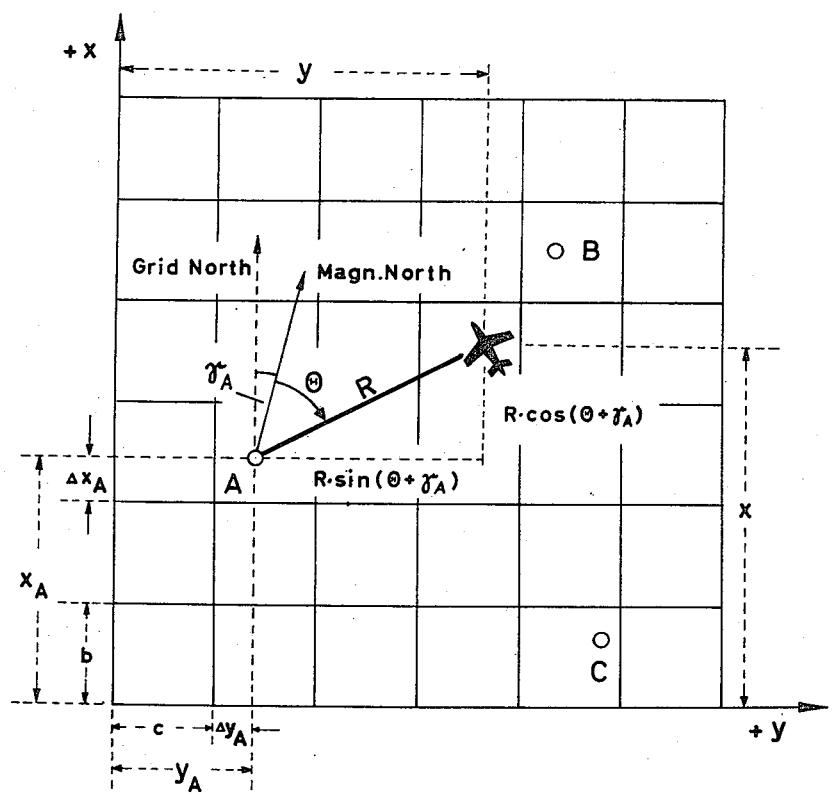
FIG. 1 is an illustration of a map or chart indicating the positions of three radio stations A, B and C of a polar-coordinate radio location network and the aircraft, and the trigonometric relationships of these positions which are utilized in one embodiment of the invention.

In FIG. 1 there is shown a map of the polar-coordinate radio location network comprising the radio stations A, B and C. It be assumed that the map is conformal and that, within the area of practical application thereof, the distortion in length is neglectable, which can be achieved by e.g. correspondingly selecting the standard parallels of a map with conformal conic projection. As a uniform standard type of coordinate system there is introduced a rectangular coordinate system, the axes of which are appropriately applied to the lefthand or respectively lower border of the map, in order to avoid negative coordinates.

When designating the coordinates of the radio station A by $x_A$ and $y_A$, the distance of the vehicle (in FIG. 1 shown to be an aircraft) from the point A by R, the direction from the station A to the vehicle with respect to the magnetic meridian of A by $\theta$, and the angle between the magnetic meridian of A and the line extending parallel in relation to the $x$-axis by $\gamma_A$ (grivation in A), then the uniform coordinates of the vehicle are $$x = x_A + R \cdot \cos(\theta + \gamma_A)$$
$$y = y_A + R \cdot \sin(\theta + \gamma_A)$$

Figure 2:
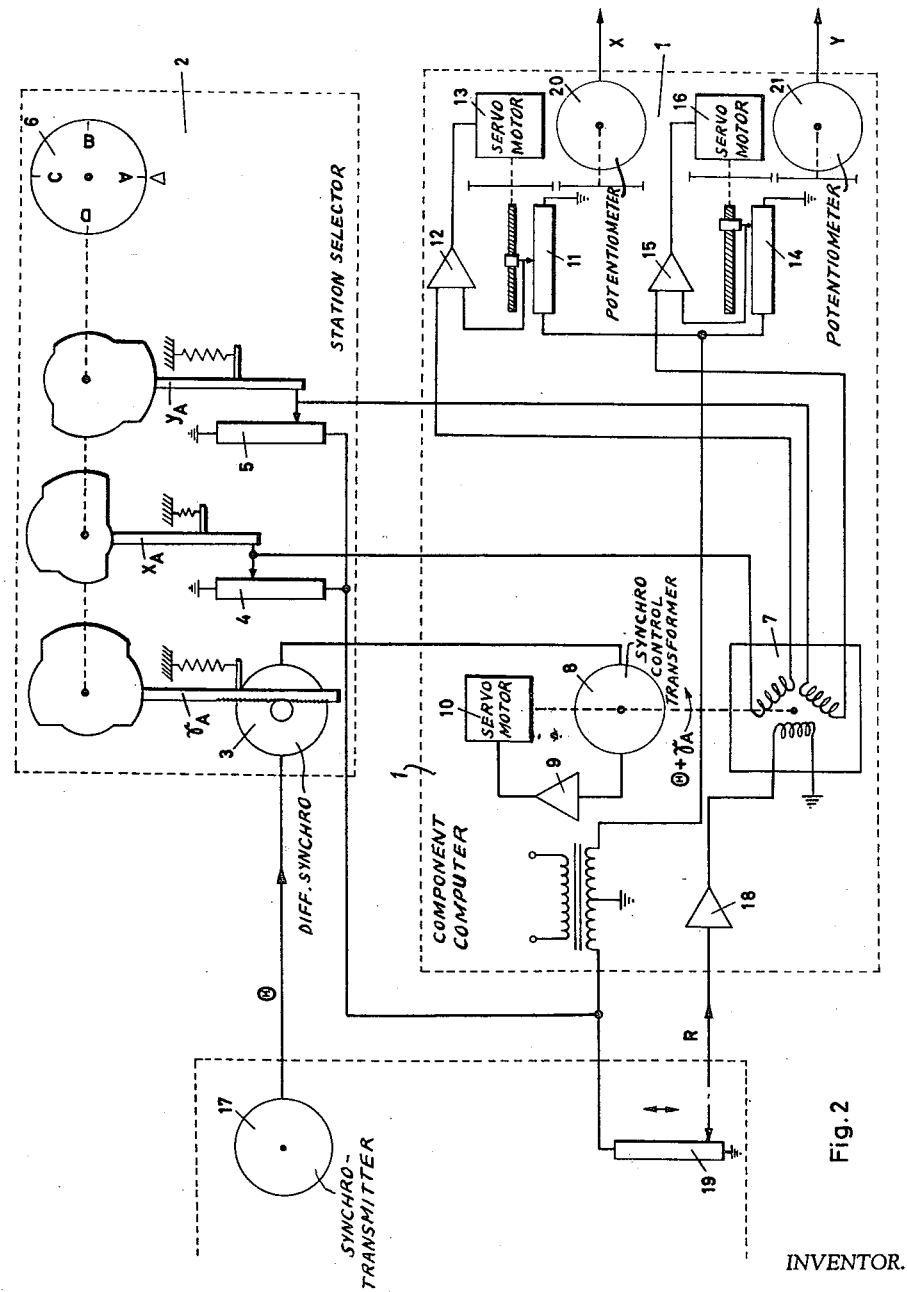
FIG. 2 is a schematic diagram of a device for the conversion of the individual local polar-coordinates into uniform rectangular coordinates.

These uniform coordinates can be calculated with the aid of the coordinate converter as schematically shown in FIG. 2, and composed of the component computer 1 and the station selector 2.

The station selector comprises a differential synchro 3 as well as two potentiometers 4 and 5. The differential synchro 3 is set in accordance with the grivation $\gamma_A$, the potentiometer 4 in accordance with the abscissa $x_A$, and the potentiometer 5 in accordance with the ordinate $y_A$ of the VORTAC- or TACAN-station A respectively. This setting is performed simultaneously by way of toothed racks and cams, i.e. by means of turning the knob 6. If another station is supposed to be selected, e.g. the station B, then the knob 6 will have to be set to the position B.

The component computer 1 is substantially composed of a resolver 7, of a synchro follow-up system 8, 9, 10, and of the two potentiometer follow-up systems 11, 12, 13 and 14, 15, 16.

The mode of operation of the coordinate converter is as follows: The differential synchro 3 of the station selector is connected to the synchro transmitter 17, which is set by the VORTAC- or TACAN-receiver respectively, in accordance with $\theta$. On account of this the angle $\theta$ is electrically added to the angle $\gamma_A$ as previously set in 3. On account of this the synchro control transformer 8 and, consequently, also the shaft of the resolver 7 is turned via the amplifier 9 and the servo-motor 10 in accordance with the angle $(\theta + \gamma_A)$. Furthermore the resolver 7 is connected via the buffer amplifier 18 to the potentiometer 19 which is set or displaced by the VORTAC- or TACAN-receiver in accordance with R. Consequently, the output voltages of the resolver are in proportion with $$R \cdot \cos(\theta + \gamma_A)$$

and $R \cdot \sin(\theta + \gamma_A)$. The voltage components applied to the potentiometers 4 and 5 and proportional to the station coordinates $x_A$ or $y_A$ respectively, are added to these voltages.

The total voltage of the potentiometer 4 and of the associating resolver component is proportional to $x = x_A + R \cdot \cos(\theta + \gamma_A)$. With the aid of the follow-up potentiometer 11, the servo-motor 13 and the amplifer 12 this total voltage is converted into one axial or shaft rotation proportional to $x$. The total voltage of the potentiometer 5 and of the other resolver component is proportional to $y = y_A + R \cdot \sin(\theta + \gamma_A)$. This total voltage is converted with the aid of the follow-up potentiometer 14, the servo-motor 16 and the amplifier 15 into an axial or shaft rotation proportional to $y$. The follow-up systems, 11, 12, 13, and 14, 15, 16 can be used e.g. directly for the driving of coordinate counting mechanisms, or otherwise for the driving of the indicating device of a conventional type of map display, indicating or displaying the position of the vehicle on a map. In addition thereto the potentiometers 20 or 21 respectively, are coupled to the potentiometers 11 or 14 respectively, by means of toothed wheels. The employment of these potentiometers, which are likewise displaced or set in accordance with $x$ or $y$ respectively, will be explained in detail hereinafter.

For increasing the accuracy of display there is preferably employed an equipment for displaying the position of crafts on the map as described in patent application Serial No. 809,642, filed April 29, 1959. This equipment comprises a map the total area of which is divided in a plurality of map sections and means for the automatically resetting of the indicator device when reaching the border of such a map section in such a way that in the following map section the position of the craft is again indicated. In FIG. 1, for example, the total area map is subdivided in 36 map sections which, without the mutual overlap, are of the width $b$ and of the length $c$. Whenever such an arrangement is chosen the transmission ratio of the follow-up potentiometers 20 or 21 respectively is appropriately thus that one rotation will correspond to the width $b$ or to the length $c$ of one map section respectively. In this way the restricted accuracy of electrical remote transmission systems can easily be increased by a multiple.

A further substantial increase in the accuracy of display can be achieved in that in the station selector 2 there are not stored, either electrically or mechanically, the uniform coordinates of the radio stations, but the coordinates with respect to the lefthand and bottom border of the map section including or containing the position of the radio station. Consequently, with respect to the station A in accordance with the showing of FIG. 1, there are not stored the complete amounts, $x_A$ and $y_A$ which, under certain circumstances, may be very large, but only the amounts of difference $$\Delta x_A = x_A - m_A \cdot b$$

$$\Delta y_A = y_A - n_A \cdot c$$

wherein $m_A$ designates the number of the complete map sections between the $y$-axis and A, and $n_A$ designates the number of the complete map sections between the $x$-axis and A.

The hitherto described navigation system permits a very simple transfer or changing-over from one radio coordinate system to the adjoining one, because only the station selector, e.g. by turning the knob 6, still needs to be switched over to the new radio coordinate system. Furthermore, it bears the advantage that position reports to ground stations can be transmitted independently of the just set or tuned-in radio station, within a uniform coordinate system and, if so desired, automatically, thus substantially improving the air-traffic control.

A further improvement, especially of importance to air navigation, is to be seen in the additional display of the course leading to the destination. According to the invention this may be accomplished in that the coordinate converter as described hereinbefore is caused to act upon an automatic dead reckoning computer (DR computer) which, from the airspeed of the aircraft and the velocity of wind, calculates both the position of the aircraft and the track, displaying the result on a map or in a coordinate display device, or in a course indicator respectively. In the course of this the coordinate converter is to be connected or to act in such a way upon the DR computer that the position fixing or indication of the DR computer, either contiuously or from time to time is automatically compared with the output data of the coordinate converter, and that the DR computer is adjusted to the coordinate converter by an automatic wind correction.

Figure 3:
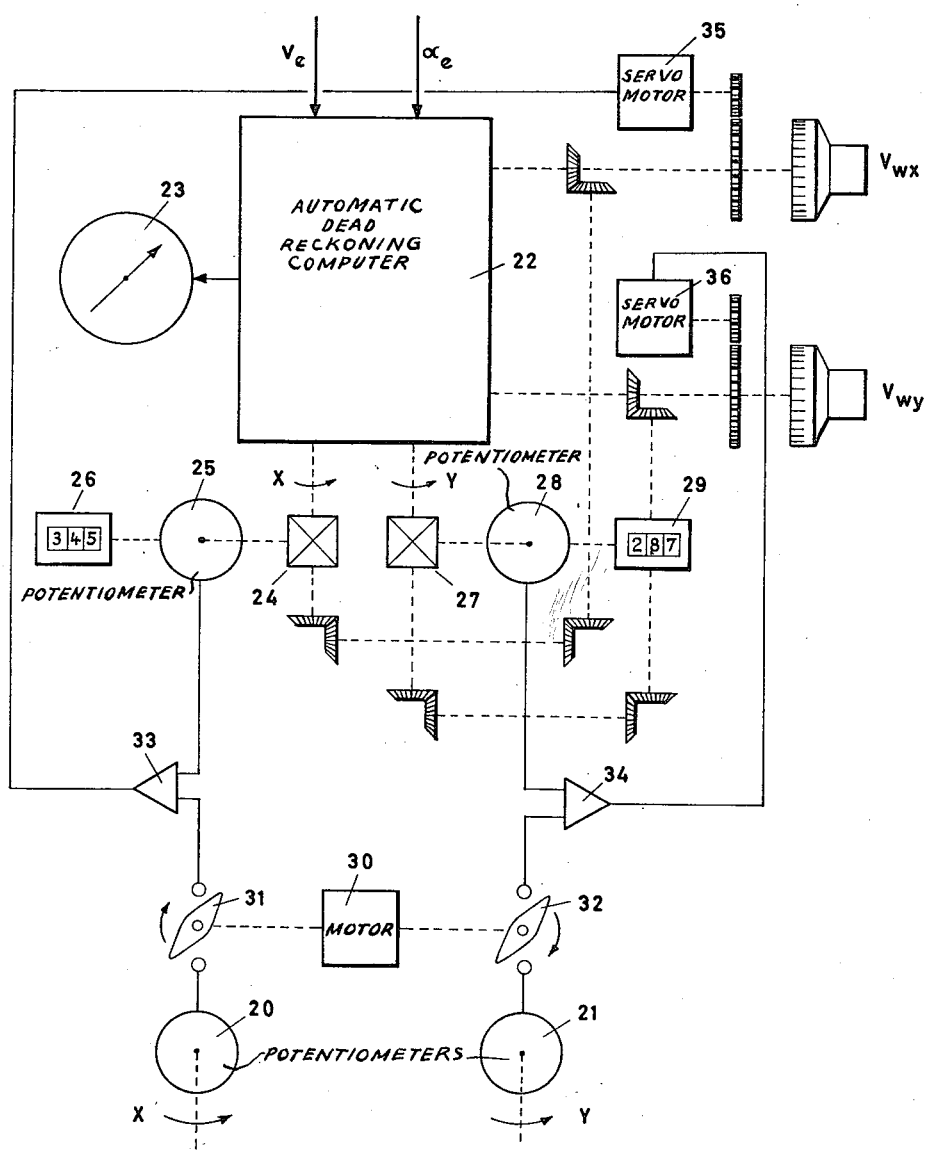
FIG. 3 is a schematic diagram of a combination of a dead reckoning computer and a coordinate converter to convert local polar coordinates into uniform rectangular coordinates.

A combination of this kind can be carried out e.g. in accordance with the schematical representation as shown in FIG. 3. The automatic dead reckoning computer 22 of the conventional type (see: e.g. W. H. Coulthard, "Aircraft Instrument Design," p. 163, Sir Isaac Pitman and Sons, Ltd., London) calculates from the true airspeed $v_e$, from the grid heading $\alpha_e$, and from the wind components $v_{wx}$ and $v_{wy}$ as referring to the uniform coordinate system $x$, $y$, the uniform coordinates $x$, $y$ of the position, as well as the track. The latter is then indicated or displayed in the course indicator 23. The coordinates $x$, $y$ are obtained as rotations of shafts. The $x$-shaft displaces via the differential gear 24 the potentiometer 25 and the counting mechanism 26 in accordance with $x$. The $y$-shaft effects the setting of the potentiometer 28 and of the counting mechanism 29 via the differential gear 27 in accordance with $y$. The rotations of the $x$-shaft and of the $y$-shaft of the automatic DR computer can also be utilized for controlling the position indicating device of a map display.

Both the potentiometers 25 and 28 are compared with the output potentiometers 20 and 21 of the coordinate converter as shown in FIG. 2 by the rotary switches as driven by the motor 30, that is, at constant time intervals. If the output potentiometers of the DR computer are not in agreement with the output potentiometers of the coordinate converter then the servo-motors 35 and 36 are switched-on via the amplifiers 33 and 34 for adapting or balancing the potentiometers 25 and 28 to the potentiometers 20 and 21 via toothed wheels and differential gears. In view of the fact that the corrections $\Delta x$ and $\Delta y$ of the potentiometers 25 and 28 are chiefly due to the errors $\Delta v_{wx}$ and $\Delta v_{wy}$ of the wind setting there will be obtained for the time interval $\Delta t$ the following relationships between two successive comparisons:

$$\Delta v_{wx} = \frac{\Delta x}{\Delta t}, \quad \Delta v_{wy} = \frac{\Delta y}{\Delta t}$$

When choosing $\Delta t$ to be constant, as is assumed in the example as given in FIG. 3, then $\Delta v_{wx}$ is proportional to $\Delta x$, and $\Delta v_{wy}$ is proportional to $\Delta y$. By correspondingly selecting the transmission ratios, therefore, also the wind setting or correcting knobs for $v_{wx}$ and $v_{wy}$ will be readjusted by the servo-motors 35 and 36 in accordance with $\Delta v_{wx}$ and $\Delta v_{wy}$ during the adjustment or balancing of the DR computer to the coordinate converter.

The balancing or adjustment may also be carried out or performed at irregular time intervals $\Delta t$. However, in this case, for example, between the shafts serving the setting of $v_{wx}$ or $v_{wy}$ respectively, and the differential gears 24 and 27 there will have to be inserted conventional types of computer gearings (such as ball and disc integrators), serving to convert the correcting rotations $\Delta v_{wx}$ and $\Delta v_{wy}$, in accordance with the equations $$\Delta x = \Delta v_{wx} \cdot \Delta t, \; \Delta y = \Delta v_{wy} \cdot \Delta t$$

into the path corrections $\Delta x$ and $\Delta y$. The balancing or adjustment may also be carried out continuously when the oscillations of the control or regulating circuits are correspondingly damped.

By the continuously performed correction of the wind setting of the DR computer there is enabled an exact calculation of the drift and, consequently, also an exact indication of the track. When providing the automatic dead reckoning computer in addition with a conventional equipment or facility for calculating the track leading from the indicated position to any desired destination, that is, when providing the DR computer e.g. with a compass card which, in the map display, can be set to the straight line connecting the two points "position"-"destination," that the thus obtained course is indicated in the course indicator, then the aircraft will move straight away towards the destination.

A combination of such kind between a radio position-finding or location system and an automatic dead reckoning computer will continuously deliver the true wind and, furthermore, bears the advantage that, in the event of an outage or failure of the radio position-finding system, the navigation can be continued with the aid of the automatic dead reckoning computer.

While the principles of the invention have been described above in connection with specific embodiments, and particular modifications thereof, it is to be clearly understood that this description is made only by way of example and not as a limitation on the scope of the invention as set forth in the objects thereof and in the accompanying claims.

What is claimed is:

1. Apparatus for determining the position of a craft relative to a uniform rectangular coordinate system comprising a radio receiving system on said craft for measuring polar coordinates R and ⊕ relative to a plurality of polar coordinate radio stations, means to store the rectangular coordinates and the angles $\gamma$ representing the zero directions of said radio stations in said uniform coordinate system, means to resolve the measured polar coordinates in components parallel to said uniform rectangular coordinate system, means to add said components to the respective stored coordinates of that radio station from which the radio signals are received, and means to transmit the computed rectangular coordinates of the craft position to a display unit.

2. An apparatus for the conversion of the polar coordinates of a craft derived from a radio navigation system in uniform rectangular coordinates as described in claim 1 in particular for the navigation of aircraft, a true airspeed transmitter, a compass transmitting heading of the aircraft, an automatic dead reckoning computer with means for inserting the wind speed preferably in two components parallel to the axis of the uniform coordinate system and computing the position and the track of said aircraft within said uniform coordinate system from the airspeed transmitted by said air speed transmitter, from the heading transmitted by said compass and from said inserted wind components, means for the transmission of the uniform rectangular coordinates computed by said dead reckoning computer and means to correct said wind setting automatically in such a way that said transmitting systems of said dead reckoning computer are adjusted according to the position of the respective transmitting systems of said apparatus for the conversion of the radio polar coordinates in uniform rectangular coordinates.

3. An apparatus as described in claim 2, means which effect said adjustment of said transmitting systems of the dead reckoning computer according to the position of the respective transmitting systems of said apparatus for the conversion of the radio polar coordinates in uniform rectangular coordinates at regular time intervals, and means to adjust the pertaining wind component settings by a corresponding amount.

4. An apparatus as described in claim 1 the transmitting systems for the rectangular coordinates of the craft position of which control the indicating device of a map display with a plurality of map sections and means for the automatically resetting of said indicator device, when reaching the border of such a map section in such a way that in the following map section the position of the craft is again indicated, said control being effected in such a way that one rotation of said transmitting systems corresponds to either the width ($b$) or the length ($c$) of said map section without the overlapping portion.

5. An apparatus as described in claim 4 and a storing unit in which instead of the uniform coordinates $x_A$, $y_A$ of any desired radio stations A are stored the coordinate differences $$\Delta x_A = x_A - m_A \cdot b$$
$$\Delta y_A = y_A - n_A \cdot b$$

wherein $b$ corresponds to the width in the $x$-direction, and $c$ to the length in the $y$-direction of a map section without overlap, and wherein $m_A$ corresponds to the number of the complete map sections between the ordinate axis of the uniform coordinate system and A, and $n_A$ corresponds to the number of the complete map sections between the abscissa axis of said uniform coordinate system and A.

6. An apparatus as described in claim 5 in particular for the navigation of aircraft, a true airspeed transmitter, a compass transmitting heading of the aircraft, an automatic dead reckoning computer with means for inserting the wind speed preferably in two components parallel to the axis of the uniform coordinate system and computing the position and the track of the aircraft within said uniform coordinate system from the airspeed transmitted by said airspeed transmitter, from the heading transmitted by said compass and from said inserted wind components, means for the transmission of the uniform rectangular coordinates computed by said dead reckoning computer and means to correct said wind setting automatically in such a way that said transmitting systems of said dead reckoning computer are adjusted according to the position of the respective transmitting systems of said apparatus for the conversion of the radio polar coordinates in uniform rectangular coordinates.

7. An apparatus as described in claim 6, means which effect said adjustment of said transmitting systems of the dead reckoning computer according to the position of the respective transmitting systems of said apparatus for the conversion of the radio polar coordinates in uniform rectangular coordinates at regular time intervals, and means to adjust the pertaining wind component settings by a corresponding amount.

References Cited in the file of this patent

UNITED STATES PATENTS

| | | |
|---|---|---|
| 2,569,328 | Omberg | Sept. 25, 1951 |
| 2,715,995 | Wirkler | Aug. 23, 1955 |